(12) United States Patent
Pitt et al.

(10) Patent No.: US 9,481,450 B2
(45) Date of Patent: Nov. 1, 2016

(54) ACTIVE STRUT APPARATUS FOR USE WITH AIRCRAFT AND RELATED METHODS

(71) Applicant: The Boeing Company, Chicago, IL (US)

(72) Inventors: Dale M. Pitt, St. Louis, MO (US); Darin P. Haudrich, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 108 days.

(21) Appl. No.: 14/321,428

(22) Filed: Jul. 1, 2014

(65) Prior Publication Data

US 2016/0001874 A1    Jan. 7, 2016

(51) Int. Cl.

| B64C 3/38 | (2006.01) |
|---|---|
| B64C 13/28 | (2006.01) |
| B64C 3/52 | (2006.01) |
| B64C 3/16 | (2006.01) |

(52) U.S. Cl.
CPC ............... *B64C 13/28* (2013.01); *B64C 3/16* (2013.01); *B64C 3/52* (2013.01); *Y02T 50/12* (2013.01); *Y02T 50/145* (2013.01); *Y02T 50/44* (2013.01)

(58) Field of Classification Search
USPC ...... 244/47, 198, 46, 199.3, 201, 219, 123.1
See application file for complete search history.

(56) References Cited

U.S. PATENT DOCUMENTS

| 1,024,929 | A | * | 4/1912 | Esnault | B64C 13/00 244/47 |
|---|---|---|---|---|---|
| 1,834,858 | A | * | 12/1931 | Metzler | B64C 3/42 244/47 |
| 1,945,254 | A | * | 1/1934 | Bittner | B64C 3/38 244/201 |
| 2,010,817 | A | * | 8/1935 | Henry | B64C 35/00 244/107 |
| 2,074,099 | A | * | 3/1937 | Adams | B64C 3/00 244/119 |
| 2,768,800 | A | * | 10/1956 | Metzler | B64C 3/42 244/38 |
| 4,674,709 | A | * | 6/1987 | Welles | B64C 23/065 244/199.4 |
| 6,986,481 | B2 | * | 1/2006 | Fanucci | B64C 3/40 244/3.26 |
| 7,198,225 | B2 | * | 4/2007 | Lisoski | B64C 3/42 244/55 |
| 7,275,722 | B2 | * | 10/2007 | Irving | B64C 23/065 244/201 |
| 9,193,444 | B2 | * | 11/2015 | Weber | B64C 5/12 |
| 2010/0076624 | A1 | | 3/2010 | Hinnant, Jr. et al. | |
| 2015/0097076 | A1 | * | 4/2015 | Lakic | B64C 3/38 244/46 |

OTHER PUBLICATIONS

Ashley, Steven, "Flying on Flexible Wings," Scientific American, Nov. 2003, 8 pages.

Garcia et al., "Roll Control for a Micro Air Vehicle Using Active Wing Morphing," American Institute of Aeronautics and Astronautics, Inc., AIAA Guidance, Navigation and Control Conference and Exhibit, Aug. 11-14, 2003, Austin, Texas, 12 pages.

\* cited by examiner

*Primary Examiner* — Christopher P Ellis
(74) *Attorney, Agent, or Firm* — Hanley, Flight & Zimmerman, LLC

(57) ABSTRACT

Active strut apparatus for use with aircraft and related methods are disclosed. An example apparatus includes a first strut having a first end and a second end opposite the first end, the first end of the first strut is operatively coupled to a fuselage of an aircraft and the second end of the first strut is operatively coupled to a wing of the aircraft, and a first actuator is operatively coupled to the first strut to change an effective length of the first strut.

20 Claims, 10 Drawing Sheets

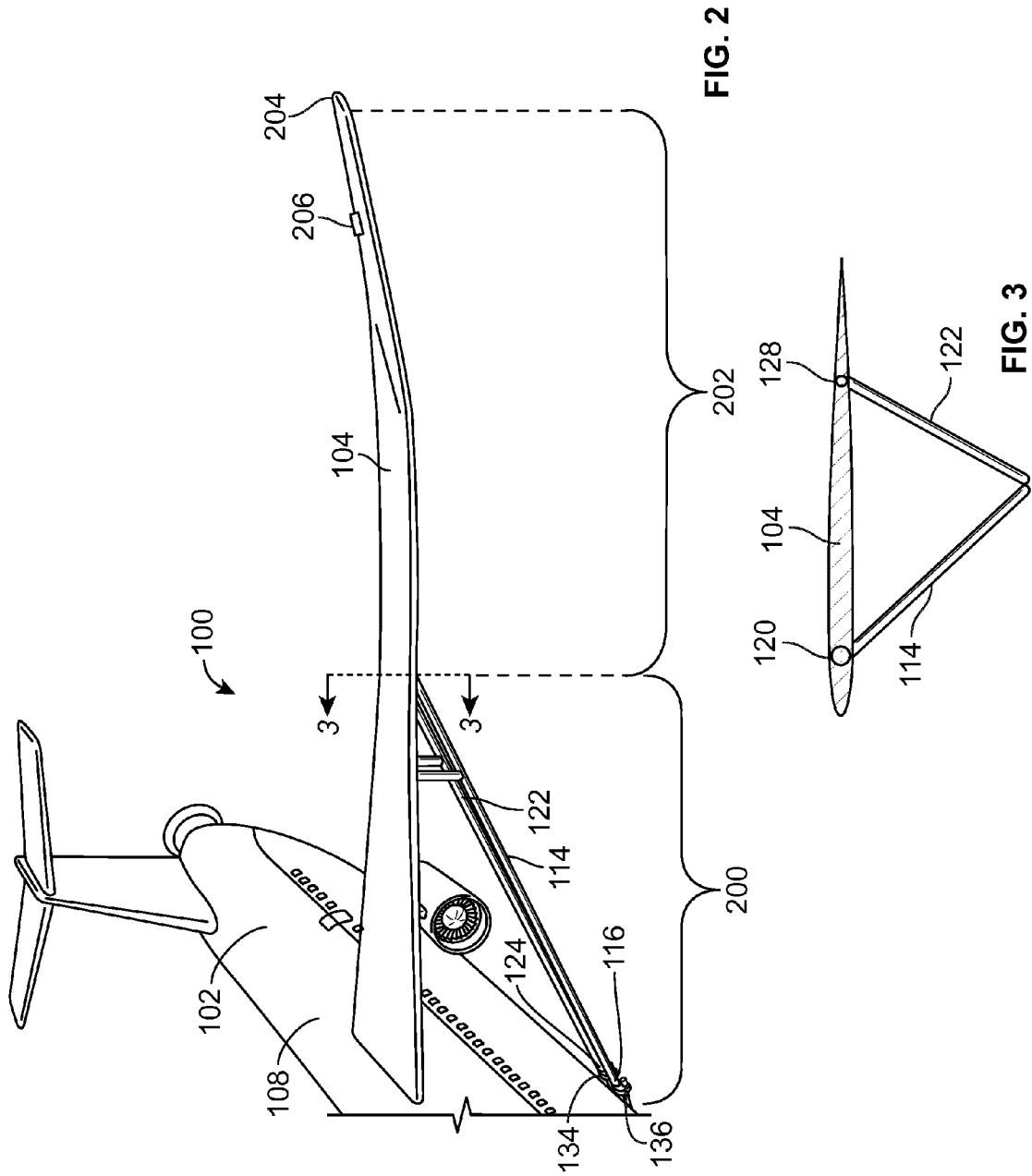

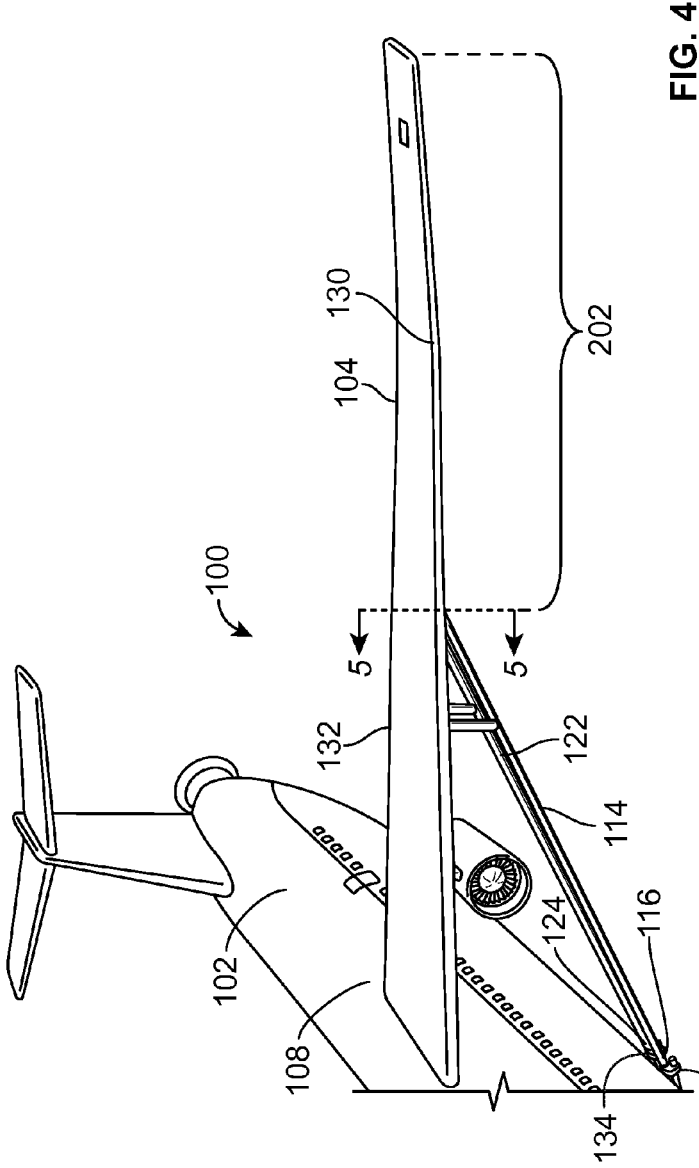
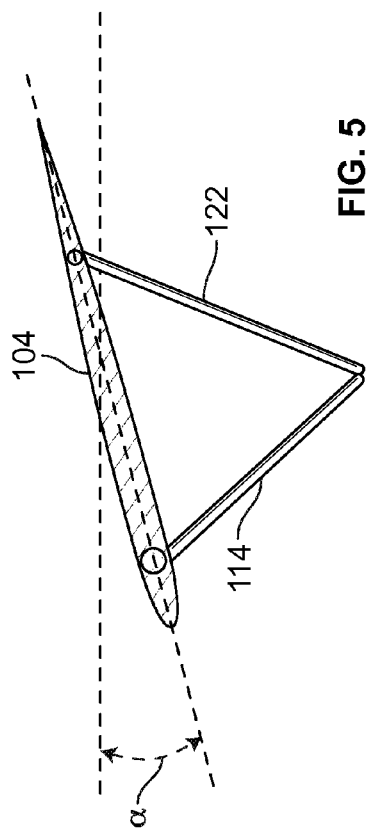
FIG. 4
FIG. 5

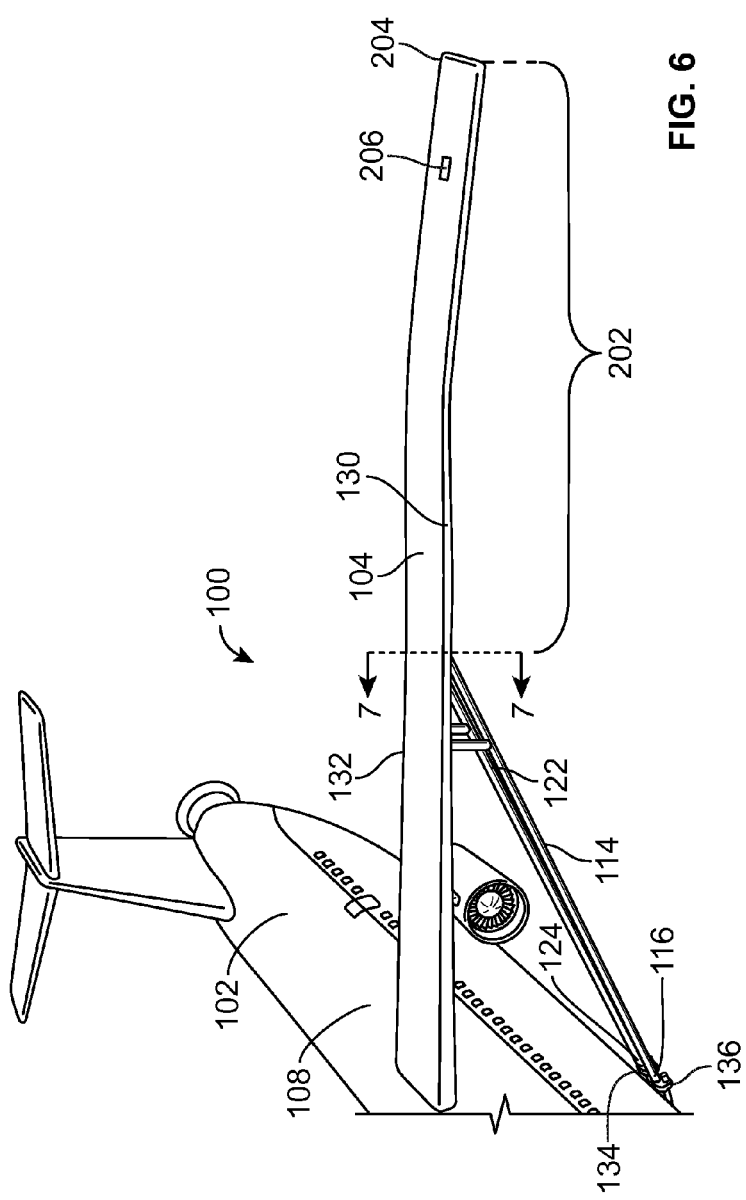
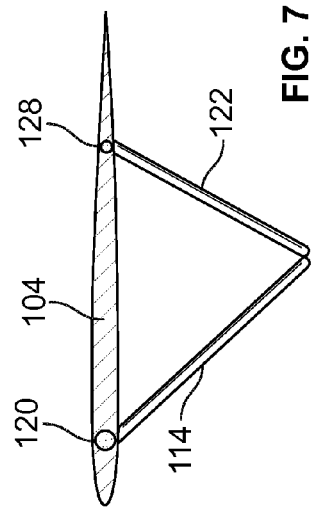

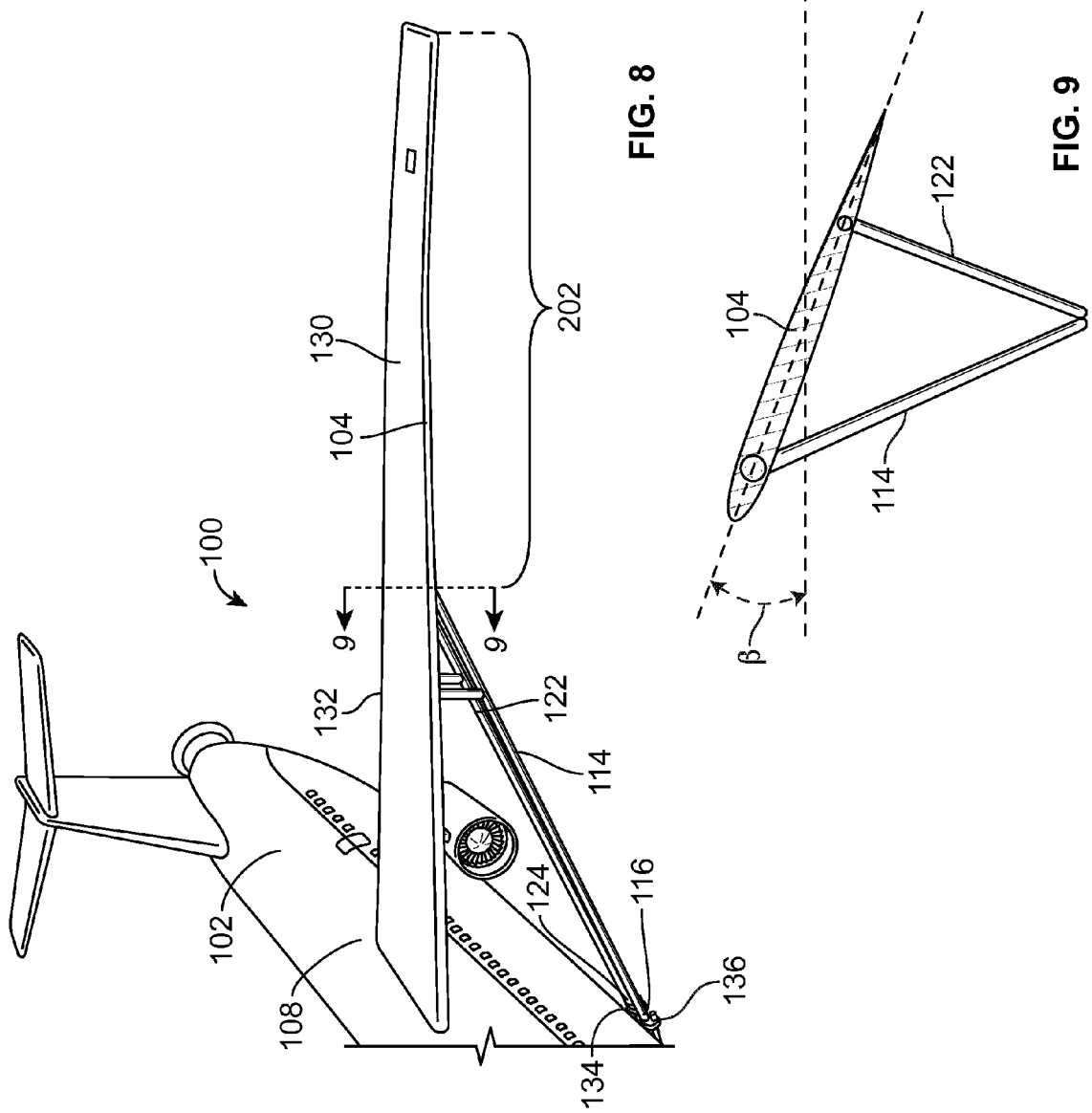

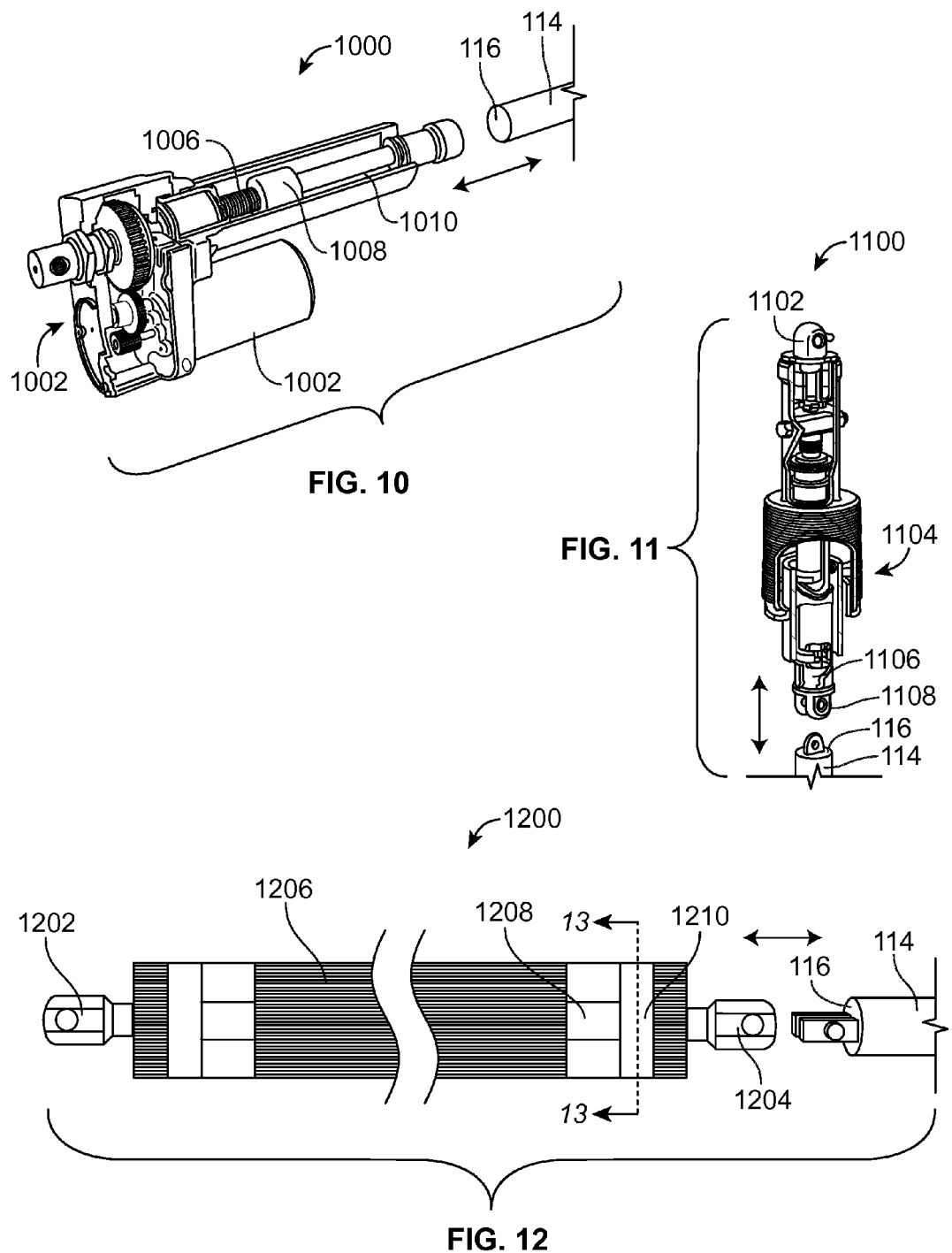

ACTIVE STRUT APPARATUS FOR USE WITH AIRCRAFT AND RELATED METHODS

FIELD

The present disclosure relates generally to aircraft and, more particularly, to active strut apparatus for use with aircraft and related methods.

BACKGROUND

Aircraft typically have a fuselage and two or more wings that are cantilevered outward from the fuselage of the aircraft. In general, higher aspect ratio wings produce more efficient flight than lower aspect ratio wings. An aspect ratio of a wing is the ratio of its length to its breadth (chord). Therefore, longer, narrower wings are generally more efficient than shorter, wider wings. However, during flight aerodynamic forces are exerted on the wings by the surrounding air due to the relative motion between the wings and the air. Longer wings are therefore generally subject to more bending stresses than shorter wings, which cause the wings to deflect and/or twist more during flight. This deflection and/or twisting can cause undesired drag and/or lift. To address this problem, some aircraft utilize relatively shorter, more rigid wings that are less susceptible to the stresses caused by the aerodynamic forces, which reduces the amount of deflection and/or twisting of the wing. However, these shorter, stiffer wings are heavier because of their rigid structural design and are less efficient than higher aspect ratio wings.

Other known aircraft such as, for example, those with longer and/or lighter wings, employ fixed or static struts between the wings of the aircraft and the fuselage (or another wing) to support the wings during flight. However, even with static struts, the wings are still subject to deflection and/or twisting due to aerodynamic loads. Particularly, a section of the wings outboard of the struts tends to deflect and/or twist under aerodynamic loads, which causes undesired drag and/or lift.

Additionally, some known aircraft store fuel (e.g., gas) within the wings of the aircraft. During flight, the weight of the wings decreases as the fuel within the wings is used. As a result, the wings become lighter during flight and, thus, are more easily deflected or deformed by aerodynamic loads. Thus, the shape of the wing changes during flight and may produce undesired drag and/or lift.

SUMMARY

An example apparatus includes a first strut having a first end and a second end opposite the first end, the first end of the first strut is operatively coupled to a fuselage of an aircraft and the second end of the first strut is operatively coupled to a wing of the aircraft, and a first actuator is operatively coupled to the first strut to change an effective length of the first strut.

Another example apparatus includes a first strut operatively coupled between a fuselage of an aircraft and a wing of the aircraft to support the wing during flight and a first actuator to adjust a tension in the first strut during flight.

An example method includes measuring deflection of a wing of an aircraft during flight, the aircraft having a first strut coupled between the wing and a fuselage of the aircraft and adjusting an effective length of the first strut between the wing and the fuselage based on the measured deflection of the wing to change the deflection of the wing.

The features, functions and advantages that have been discussed can be achieved independently in various embodiments or may be combined in yet other embodiments further details of which can be seen with reference to the following description and drawings.

BRIEF DESCRIPTION OF THE DRAWINGS

FIG. 2 is a front view of a wing of the example aircraft of FIG. 1 when example struts of the example active strut apparatus are in a first position during a first flight condition.

FIG. 3 is a cross-sectional view of the wing of FIG. 2 taken along line 3-3.

FIG. 4 is a front view of the wing of the example aircraft of FIG. 1 when the example struts of the example active strut apparatus are in a second position during the first flight condition.

FIG. 5 is a cross-sectional view of the wing of FIG. 4 taken along line 5-5.

FIG. 6 is a front view of the wing of the example aircraft of FIG. 1 when the example struts of the example active strut apparatus are in a first position during a second flight condition.

FIG. 7 is a cross-sectional view of the wing of FIG. 6 taken along line 7-7.

FIG. 8 is a front view of the wing of the example aircraft of FIG. 1 when the example struts of the example active strut apparatus are in a second position during the second flight condition.

FIG. 9 is a cross-sectional view of the wing of FIG. 8 taken along line 9-9.

FIG. 10 is a partial cross-sectional view of an example actuator that may be implemented with the example active strut apparatus of FIG. 1.

FIG. 11 is a partial cross-sectional view of an alternative example actuator that may be implemented with the example active strut apparatus of FIG. 1.

FIG. 12 is a side view of another alternative example actuator or an example strut that may be implemented with the example active strut apparatus of FIG. 1.

Figure 1:
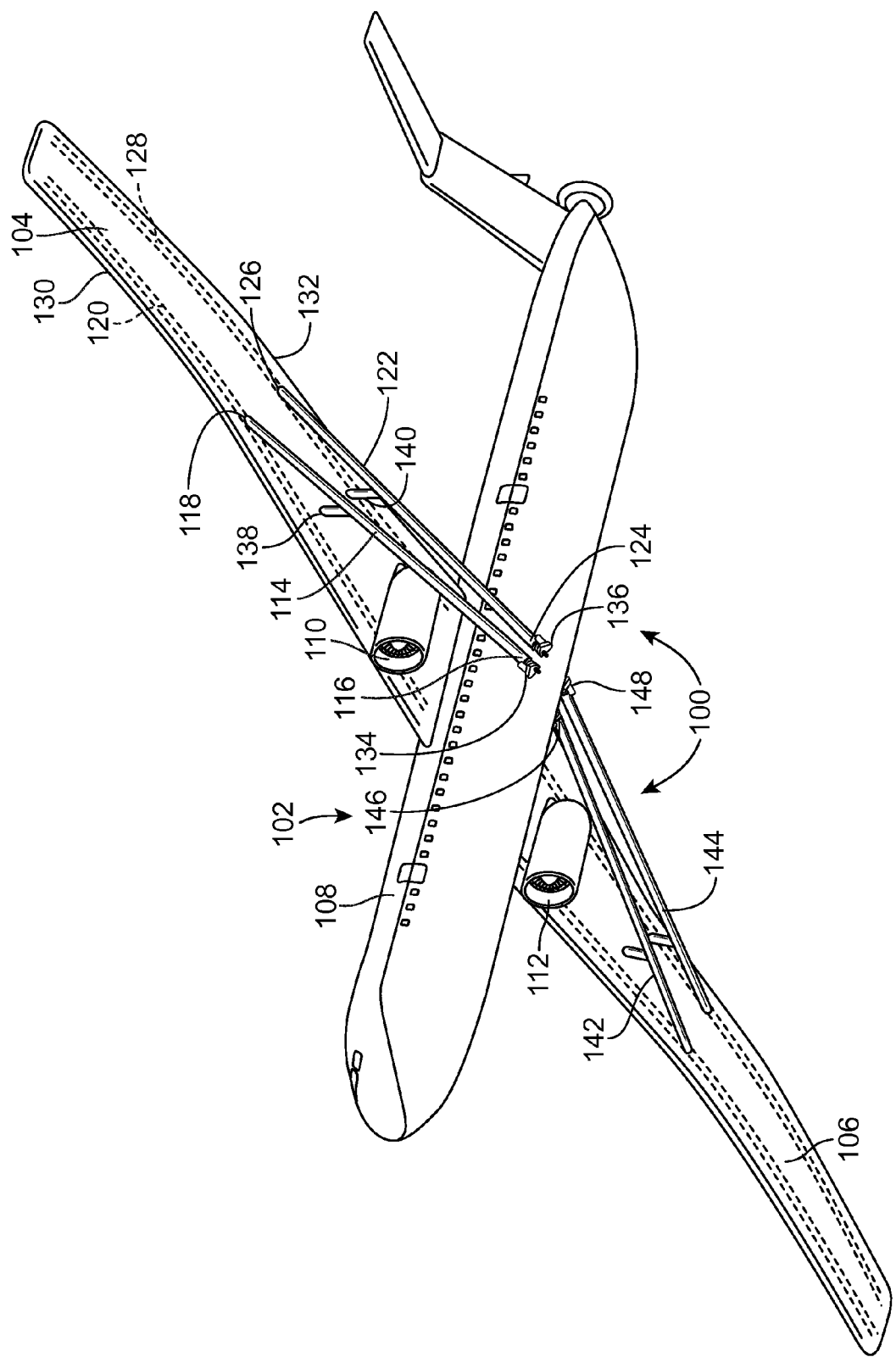
FIG. 1 illustrates an example active strut apparatus employed on an example aircraft in accordance with the teachings of this disclosure.

Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. As used herein, the terms "coupled" and "operatively coupled" are defined as connected directly or indirectly (e.g., through one or more intervening structures and/or layers). Stating that any part is in contact with another part means that there is no intermediate part between the two parts.

DESCRIPTION

Aircraft typically have a fuselage and two or more wings that are cantilevered outward from the fuselage of the aircraft. During flight, the relative motion between the wings and the surrounding air exerts aerodynamic loads on the wings. An aspect ratio of a wing is the ratio of its length to its breadth (chord). A higher aspect ratio generally indicates a longer, narrow wing, whereas a lower aspect ratio generally indicates a shorter, wider wing. In general, a higher aspect ratio wing (e.g., a longer, more narrow wing) produces more efficient flight (e.g., at cruise) than a lower aspect ratio wing. However, longer wings are subject to more bending stresses that result in a change in geometry of the wing such as, for example, a change in shape, a deflection, a deformation, a change in profile, a change in position, a bending and/or twisting of the wing. Some aircraft utilize relatively shorter, more rigid wings (e.g., lower aspect ratio wings) that are less susceptible to the stresses to overcome this problem. However, these relatively shorter, more rigid wings are heavier because of their rigid structural design and are less efficient than higher aspect ratio wings.

Other known aircraft such as, for example, those with longer and/or lighter wings (e.g., higher aspect ratio wings), employ fixed or static struts between the wings of the aircraft and the fuselage (or another wing) to support the wings during flight. Longer wings are subject to higher bending stresses for a given load than shorter wings, so the static struts are employed to meet the more stringent structural design specifications. Also, longer wings may experience relatively higher torsional loads than shorter wings and, in some applications, this torsional load is undesirable (e.g., if the warped wing interferes with the aileron effect). Therefore, even with static struts, the wing is still greatly affected by aerodynamic loads, which cause the wing to change geometry or shape (e.g., to deflect, twist, bend, deform, etc.). For example, the section of the wing outboard from the point where the struts connect may deflect and/or twist due to these stresses. These deformations of the wing can cause undesired drag and/or lift and decrease the efficiency (e.g., fuel efficiency) of the aircraft.

Some aircraft permanently align the wings at an optimal angle for bending at a certain condition (e.g., during cruise). However, aircraft typically store fuel within the wings of the aircraft and, during flight, the weight of the wings decreases as the fuel within the wings is used. As a result, the wings become lighter during flight and, thus, are more easily deflected or deformed by aerodynamic loads as the flight progresses. Additionally, other factors such as speed, altitude, weather, load, etc. affect the amount of aerodynamic forces acting on the wings. Therefore, throughout flight, the amount of stresses and deflection or deformation of a wing may change, which can cause undesired drag and/or lift and, therefore, less efficient flight.

Example active strut apparatus and related methods disclosed herein employ one or more active struts between a fuselage of an aircraft and a wing of the aircraft, where the struts are adjustable to change a tension in and/or an effective length of the respective strut (between the wing and the fuselage) to change or modulate an angle and/or position (e.g., twist) of the wing and, thus, alter a deflection or deformation of the wing caused by aerodynamic loads. In this manner, the wing may be actively positioned at a more optimal angle and the amount of drag and/or lift caused by aerodynamic loads may be controlled (e.g., increased or decreased) depending on the desired outcome. Additionally, the geometry or shape of the wing can be adjusted throughout a flight (e.g., during cruise) to account for changing parameters (e.g., decreasing fuel in the wings, increasing speed, etc.), which results in improved aerodynamic performance and greater efficiency throughout the flight.

An example active strut apparatus disclosed herein employs two struts coupled between a wing of an aircraft and a fuselage of the aircraft. A first one of the struts (e.g., a forward strut) is coupled to the wing at a forward location (e.g., closer to a leading edge) on the wing, and a second one of the struts (e.g., an aft strut) is coupled to the wing at a rearward or aft location (e.g., closer to a trailing edge) on the wing. To change the tensions in and/or the effective lengths of the first and second struts, two actuators are coupled to the fuselage. More specifically, the first strut is coupled to one of the actuators carried by the fuselage and the second strut is coupled to the other actuator carried by the fuselage. Depending on the geometry or shape (e.g., deflection, deformation, bending, twisting, etc.) of the wing during flight, the actuators can increase or decrease, independently, the tensions in and/or effective lengths of the first and second struts to change the angle and/or position of the wing and, thus, affect the amount of deflection of the wing.

Thus, unlike known wing systems, with the examples disclosed herein the amount of deflection or deformation of the wing may be actively increased or decreased. More specifically, because the angle and/or position of the wing at the point(s) where the first and second struts are attached can be changed, the amount of bending and/or twisting of the wing (e.g., outboard or outward of the struts) can also be changed. As a result, the amount of drag and/or lift caused by the wing during flight can be controlled. In some examples, the amount of drag can be reduced, which increases the efficiency of the aircraft by minimizing fuel burn and reducing aircraft operational costs. In other examples, the amount of drag can be increased such as, for example, during a descent or during landing. In addition, this control of the deflection and/or twisting of the wing produces greater control and maneuverability of the aircraft. For example, the amount of deflection and/or twisting of the wing can be controlled to produce more or less drag and/or lift. In some examples, the drag and/or lift can be used to advantageously supplement the type of control typically provided by the ailerons.

FIG. 1 illustrates an example active strut apparatus 100 employed on an example aircraft 102. The example active strut apparatus 100 may be implemented on any type of aircraft. In the illustrated example, the aircraft 102 has a left or first wing 104 and a right or second wing 106. The first wing 104 and the second wing 106 are coupled to and cantilevered outward from a fuselage 108 (e.g., an aircraft body, a main body). In the illustrated example, the aircraft 102 has a left or first engine 110 carried by the first wing 104 and a right or second engine 112 carried by the second wing 106. In other examples, the aircraft 102 may include more or fewer engines (e.g., one engine, four engines, etc.) and the engine(s) may be located elsewhere on the aircraft 102 (e.g., on a tail of the aircraft 102).

In the illustrated example, the active strut apparatus 100 includes a forward or first strut 114 (e.g., a tie rod, a cantilever support, a support member, a tension strut) disposed between the fuselage 108 and the first wing 104. The first strut 114 is a rigid member that braces or supports the first wing 104 and may carry tensile or compressive forces to support the first wing 104. In some examples, the first strut 114 provides extra bending and/or torsional stiffness to the first wing 104. As illustrated, a first end 116 of the first strut 114 is coupled to the fuselage 108, and a second end 118 of the first strut 114 is coupled to the first wing 104. In the illustrated example of FIG. 1, the first strut 114 is coupled to or proximate a forward spar 120 (shown in dashed lines) of the first wing 104. The forward spar 120 is a structural member disposed within the first wing 104 and extending the length of the first wing 104. In other examples, the first strut 114 is coupled to the skin or outer surface of the first wing 104 (e.g., at or near the forward spar 120). The first strut 104 may be coupled to the forward spar 120 or the surface of the first wing 104 by any suitable fastening mechanism known to those skilled in the art (e.g., welding, mechanical fastener(s), etc.).

In the illustrated example of FIG. 1, the active strut apparatus 100 also includes an aft or second strut 122 coupled between the fuselage 108 and the first wing 104. The second strut 122 is a rigid member that also braces or supports the first wing 104 and may also carry tensile or compressive forces to support the first wing 104. In some examples, the second strut 122 provides extra bending and/or torsional stiffness to the first wing 104. In the first illustrated example, a first end 124 of the second strut 122 is coupled to the fuselage 108, and a second end 126 of the second strut 122 is coupled to the first wing 104. Specifically, the second strut 122 in the illustrated example is coupled to or proximate an aft spar 128 (shown in dashed lines) in the first wing 104. The rear spar 128 is another structural member disposed within the first wing 104 and extending the length of the first wing 104. In other examples, the second strut 122 is coupled to the skin or outer surface of the wing 104 (e.g., at or near the rear spar 128). In the illustrated example, the second end 118 of the first strut 114 is coupled to the first wing 104 closer to a forward or leading edge 130 of the first wing 104 and the second end 126 of the second strut 122 is coupled to the first wing 104 closer to a rear (e.g., aft) or trailing edge 132 of the first wing 104. Additionally, in the illustrated example, the first and second struts 114, 122 are coupled to the first wing 104 along substantially the same line in the first wing 104 extending from the forward edge 130 to the rear edge 132 (e.g., the second ends 118, 126 are substantially aligned with each other along a common chord). However, in other examples, the second ends 118, 126 may be staggered or spaced apart and not aligned (e.g., the second end 118 of the first strut 114 may be positioned further outward or outboard on the first wing 104 than the second end 126 of the second strut 122).

In the illustrated example, the first and second struts 114, 122 are coupled to the fuselage 108 in substantially the same location (e.g., proximate each other, adjacent each other), such that the first and second struts 114, 122 are angled inward (e.g., toward each other) in the direction of the fuselage 108. However, in other examples, the first and second struts 114, 122 may be substantially parallel.

To support the wing 104, the first and second struts 114, 122 are positioned at an angle relative to the first wing 104. In the illustrated example, the first and second struts 114, 122 are positioned at an acute angle relative to a bottom surface of the first wing 104. However, in other examples, the first strut 114 and/or the second strut 122 may be positioned at other angles. Additionally, in the illustrated example, the first and second struts 114, 112 are coupled to the fuselage 108 near a bottom of the fuselage 108, below the first wing 104. However, in other examples, the first and second struts 114, 122 can be positioned near a top of the fuselage 108, above the wing 104, and coupled to a top surface of the first wing 104.

During flight, aerodynamic loads or forces on the first wing 104 may cause the first wing 104 to change geometry (e.g., to change shape, to change profile, to change position, to change angle, to deflect, to deform, to bend, to twist, etc.). For example, the aerodynamic load may cause the first wing 104 to bend and twist upward or downward relative to its chord line. Additionally, the amount of deflection (e.g., bending) and twist may vary during flight depending upon various factors such as, for example, airspeed, weather conditions, the volume of fuel in the wings, a loading of the aircraft, a flight path of the aircraft, altitude, temperate, pressure, etc. For example, with longer flights, the amount of deflection and/or twisting of the first wing 104 may change as the fuel in the first wing 104 is used. In some examples, this deflection and/or twisting of the first wing 104 may increase the amount of drag and/or lift generated by the first wing 104 and, thus, decrease the efficiency of flight.

To change (e.g., modulate) the geometry or shape of the first wing 104 and control of the amount of deflection and/or twist of the first wing 104, the active strut apparatus 100 employs a first actuator 134 coupled between the fuselage 108 and the first end 116 of the first strut 114. The first actuator 134 operates to change a tension in and/or an effective length of the first strut 114 and, thus, change the geometry or shape of the first wing 104. The effective length of the first strut 114 is the distance or dimension between the point where the first strut 114 is coupled to the fuselage 108 (at the first actuator 134) and the point where the first strut 114 is coupled to the first wing 104. The first end 116 of the first strut 114 may be coupled to, for example, a stem or pin of the first actuator 134 that is actuated to move inward or outward from the first actuator 134. The first actuator 134 operates to move the first end 116 of the first strut 114 away from or toward the fuselage 108 to change the tension in and/or the effective length of the first strut 114. For example, during certain flight conditions such as, for example, when the aerodynamic forces exert an upward force on the first wing 104, the first strut 114 is in tension. In such an example, the stem or pin of first actuator 134 may be extended to push the first end 116 of the first strut 114 outward to relieve or release the tension in the first strut 114 and/or increase the effective length of the first strut 114. As a result, the forward edge 130 of the first wing 104 (e.g., at or near the point where the first strut 114 is coupled to the wing 104) is allowed to move or tilt (e.g., twist, angle) further upward under aerodynamic load. In some examples, aerodynamic load forces the forward edge 130 upward, while in other examples the first strut 114 exerts force on the first wing 104 to move the forward edge 130 upward. In this manner, the geometry or shape of the first wing 104 caused by aerodynamic loads or forces can be changed. In another example, the first actuator 134 may be operated to pull or retract the first end 116 of the first strut 114 toward the fuselage 108, causing the forward edge 130 of the first wing 104 (e.g., at or near the point where the first strut 114 is connected to the wing 104) to move or tilt downward, thereby changing the geometry or shape of the first wing 104. Therefore, the first actuator 134 operates to change the tension in and/or effective length of the first strut 114 to change the geometry or shape of the first wing 104.

In some examples, the first actuator 134 operates to move the first strut 114 in a direction substantially along a longitudinal axis of the first strut 114. In other examples, the first actuator 134 is positioned to move the first end 116 of the first strut 114 in another direction not aligned with the longitudinal axis of the first strut 114. In some examples, the first end 116 of the first strut 114 is coupled to the first actuator 134 via a joint or knuckle, which allows the first end 116 of the first strut 114 to pivot or rotate relative to the first actuator 134.

Likewise, to change a tension in and/or an effective length of the second strut 122 of the illustrated example, the active strut apparatus 100 employs a second actuator 136 coupled between the fuselage 108 and the first end 124 of the second strut 122. The effective length of the second strut 122 is the distance or dimension between the point where the second strut 122 is coupled to the fuselage 108 (at the second actuator 136) and the point where the second strut 122 is coupled to the first wing 104. The first end 124 of the second strut 122 may be coupled to, for example, a stem or pin of the second actuator 136. The second actuator 136 operates to move the second end 124 of the second strut 122 away from or toward the fuselage 108 to change the tension in and/or the effective length of the second strut 122. For example, assuming the second strut 122 is in tension, the stem or pin of the second actuator 136 may be extended to move the first end 124 of the second strut 122 outward to relieve or release the tension in the second strut 122 and/or increase the effective length of the second strut 122. As a result, the rear edge 132 of the first wing 104 (e.g., at or near the point where the second strut 122 is connected to the wing 104) is allowed to move or tilt (e.g., twist, angle) upward under aerodynamic load. In some examples, aerodynamic load forces the rear edge 132 upward, while in other examples the second strut 122 exerts force on the first wing 104 to move the rear edge 132 upward. In this manner, the geometry or shape of the first wing 104 caused by aerodynamic loads or forces is changed. In another example, the second actuator 136 may be operated to pull the first end 124 of the second strut 122 toward the fuselage 108, which causes the rear edge 132 of the first wing 104 (e.g., at or near the point where the second strut 122 is connected to the first wing 104) to move or tilt downward. Therefore, the second actuator 136 operates to change the tension in and/or effective length of the second strut 122 to change the geometry or shape of the first wing 104.

In some examples, the second actuator 136 operates to move the second strut 122 in a direction substantially along a longitudinal axis of the second strut 122. In other examples, the second actuator 136 is positioned to move the first end 124 of the second strut 122 in another direction not aligned with the longitudinal axis of the second strut 122. In some examples, a joint or knuckle may be employed between the first end 124 of the second strut 122 and the second actuator 136, which allows the first end 124 of the second strut 122 to pivot or rotate relative to the second actuator 136.

In the illustrated example, the first and second actuators 134, 136 operate independently to control the first and second struts 114, 122. For example, assuming the first and second struts 114, 122 are in tension, the first actuator 134 may be activated to decrease the tension and/or increase the effective length of the first strut 114 while (e.g., simultaneously) the second actuator 136 may be activated to increase the tension in and/or decrease the effective length of the second strut 122. As a result, the wing 104 (e.g., at and/or near the connection of the first and second struts 114, 122) is angled (e.g., twisted, tilted) more downward. In another example, the first actuator 134 may be activated to increase the tension in and/or decrease the effective length of the first strut 114 while the second actuator 136 may be activated to decrease the tension and/or increase the effective length of the second strut 122. As a result, the wing 104 (e.g., at and/or near the connection of the first and second struts 114, 122) is angled (e.g., twisted, tilted) more upward.

In the illustrated example, the first and second actuators 134, 136 are coupled to the fuselage 108 of the aircraft 102 and operate to move the respective first ends 116, 124 of the respective first and second struts 114, 122. However, in other examples, the first and second actuators 134, 136 may instead be disposed on the first wing 104 and operate to move the second ends 118, 126 of the respective first and second struts 114, 122. In some examples, the first actuator 134 and/or the second actuator 136 are coupled directly to the surface of the fuselage 108. In other example, the first actuator 134 and/or the second actuator 136 are contained with an opening or compartment in the side of the fuselage 108.

In the illustrated example, a third strut or support member 138 is disposed between the first strut 114 and the first wing 104 and a fourth strut or support member 140 is disposed between the second strut 122 and the first wing 104. The third and fourth struts 138, 140 provide additional structural support for the first wing 104. In some examples, additional struts or support members are provided between the first strut 114 and the first wing 104 and/or the second strut 122 and the first wing 104. In other examples, the third strut 138 and/or the fourth strut 140 are not employed.

In some examples, only one active strut is employed. For example, only the first strut 114 and the first actuator 136 may be implemented to control the deflection and/or twist of the first wing 104. In other examples, multiple active struts may be employed. For example, three struts and respective actuators may be employed to control the deflection and/or twist of the wing, and the struts may be attached in various locations along the length of the first wing 104.

In some examples, modulating the tension in and/or the effective length of the first strut 114 and/or the second strut 122 has static aeroelastic twist effects on the first wing 104. Additionally or alternatively, modulating the tension in and/or the effective length of the first strut 114 and/or the second strut 122 has dynamic aeroelastic effects such as, for example, those relating to flutter speed. For example, the first strut 114 and/or the second strut 122 may be modulated to change the flutter speed of the first wing 104. In some examples, using the first strut 114 and/or the second strut 122 to angle and/or position the first wing 104 downward results in an increased flutter speed.

In the illustrated example, the active strut apparatus 100 also includes two struts 142, 144 coupled between the second wing 106 and the fuselage 108 and two actuators 146, 148 coupled between the ends of the respective struts 142, 144 and the fuselage 108. The active struts 142, 144 of the example active strut apparatus 100 on the second wing 106 may be similar or identical to the active struts 114, 122 of the example active strut apparatus 100 disclosed above in relation to the first wing 104. Thus, any of the components, parts, systems, methods, etc. disclosed herein in connection with the left or first wing 104 may be the same or similar to the right or second wing 106.

FIG. 2 illustrates a bending and twisting of in the first wing 104 that may be caused during a first flight condition such as, for example, when an aerodynamic load exerts an upward force on the first wing 104. In the illustrated example, the aerodynamic load creates stresses in the first wing 104 that cause the first wing 104 to bend and twist upward and/or rearward. This bending and twisting may cause undesired drag and/or lift and may negatively affect control (e.g., roll control) of the aircraft 102. The first wing 104 has two sections: an inboard wing section 200 and an outboard wing section 202. The inboard wing section 200 is the section of the first wing 104 from the connection of first wing 104 at the fuselage 108 to the points at which the first and second struts 114, 122 are coupled to the first wing 104. The outboard wing section 202 is the section of the first wing 104 from the points at which the first and second struts 114, 122 are coupled to the first wing 104 to a tip 204 of the first wing 114. In the illustrated example, the outboard wing section 202 is under greater stress than the inboard wing section 200, which results in relatively greater bending and twisting of the outboard wing section 202.

FIG. 3 is a cross-sectional view of the first wing 104 taken along line 3-3 of FIG. 2. In the illustrated example, the first and second struts 114, 122 are under stress (e.g., tensile stress) due to an aerodynamic load imparting upward and/or rearward forces on the first wing 104. In the illustrated example, the first strut 114 is coupled to the forward spar 120 and the second strut 122 is coupled to the rear or aft spar 128. In the illustrated example of FIGS. 2 and 3, the first and second struts 114, 122 support the wing 104 in a substantially horizontally orientation (e.g., in a first position). However, as illustrated in FIG. 2, the outboard wing section 202 is bent upward and twisted.

To decrease the drag and/or lift created by the bending and twisting of the first wing 104 (e.g., the deflection of the outboard wing section 202), the first and second actuators 134, 136 are employed to adjust the tension in and/or effective length of the respective first and second struts 114, 122 to change the position and/or angle of the first wing 104 and thereby affect the geometry or shape of the first wing 104. In the illustrated example, the first end 116 of the first strut 114 is coupled to the first actuator 134 and the first end 124 of the second strut 122 is coupled to the second actuator 136. The first and second actuators 134, 136 operate independently to move the respective first and second struts 114, 122 toward or away from the fuselage 108. In some examples, the amount of deflection or deformation of the first wing 104 may be measured (e.g., sensed, detected, etc.) by a sensor 206. In the illustrated example, the sensor 206 is a strain gauge that is mounted to the skin or surface of the first wing 104. In other examples, other types of sensors may be utilized. The sensor 206 transmits a signal to, for example, a processor (disclosed in further detail below), which determines the amount that the first and/or second actuators 134, 136 are to move the respective first and/or second struts 114, 122 to affect (e.g., increase or decrease) the bending and twisting in the first wing 104. Additionally or alternatively, the amount of tension and/or length to be changed in the first strut 114 and/or the second strut 122 may depend on other factors or parameters such as, for example, the speed of the aircraft, the altitude of the aircraft, the temperature of the surrounding air, the pressure of the surrounding air, weather conditions, the flight path of the aircraft, and/or the volume of fuel in the first wing 104 (e.g., the weight of the first wing 104). In some examples, a processor compares one or more of these parameters with a threshold or range provided by, for example, a look-up table. In some examples, the processor determines the amount of bending and twisting of in the first wing 104 based on one or more of the parameters, an optimal wing position based on one or more of the parameters, and/or the amount of tension and/or length to be changed in the first strut 114 and/or the second strut 122 to place the first wing 104 in an optimal or more flight efficient wing position.

FIG. 4 illustrates an example of the first wing 104 during the first flight condition (e.g., the same flight condition as in FIG. 2) after the first and second struts 114, 122 of the active strut apparatus 100 have been adjusted or activated (e.g., moved to a second position) to change the amount of bending and twisting of the first wing 104. In the illustrated example, the first actuator 134 has increased the tension in the first strut 114 and/or decreased the effective length of the first strut 114 (e.g., by moving the first end 116 of the first strut 114 toward the fuselage 108). Additionally, the second actuator 136 has decreased the tension in the second strut 122 and/or increased the effective length of the second strut 122 (e.g., by moving the first end 124 of the second strut 122 away from the fuselage 108). As a result, the forward edge 130 of the first wing 104 (e.g., at or near the connection of the first strut 114) is moved downward and the rear edge 132 of the first wing 104 (e.g., at or near the connection of the second strut 122) is moved more upward.

FIG. 5 is a cross-sectional view of the first wing 104 taken along line 5-5 of FIG. 4. In the illustrated example, the first strut 114 is under more tension and/or is effectively shortened compared to the first position illustrated in FIGS. 2 and 3, and the second strut 122 is under less stress and/or is effectively lengthened compared to the first position in FIGS. 2 and 3.

In the illustrated example, the first wing 104 (at or near the connection of the first and second struts 114, 122) is angled and/or positioned downward at angle α. As a result, the outboard wing section 202 is deflected and twisted less than the first wing 104 in the first position illustrated in FIGS. 2 and 3 and, thus, the drag and/or lift caused by the bending and twisting is reduced. In this manner, the example active strut apparatus 100 can change (e.g., decrease) the amount of wing deflection (e.g., bending, twisting, etc.). The angle α may be any amount (e.g., 3°, 5°, 10°, etc.) depending on the operation of the first and second actuators 134, 136.

FIG. 6 illustrates a bending and twisting of the first wing 104 that may be caused during a second flight condition such as, for example, when an aerodynamic load exerts a downward force on the first wing 104. In the illustrated example, the aerodynamic load creates stresses in the first wing 104 that cause the first wing 104 to bend and twist downward (e.g., such that the forward edge 130 of the first wing 104 is lower than the trailing edge 132 of the first wing 104). This bending and twisting of the first wing 104 may cause undesired drag and/or lift and, thus, negatively affect control of the aircraft 102 and/or decrease the efficiency of the aircraft 102 during flight.

FIG. 7 is a cross-sectional view of the first wing 104 taken along line 7-7 of FIG. 6. In the illustrated example, the first and second struts 114, 122 are in compression due to the aerodynamic load imparting downward and/or rearward forces on the first wing 104. In the illustrated example, the first strut 114 is coupled to the forward spar 120 and the second strut 122 is coupled to the rear or aft spar 128. The first and second struts 114, 122 support the first wing 104 in a substantially horizontally orientation (e.g., in a first position). However, as illustrated in FIG. 7, the outboard wing section 202 is deflected downward and twisted.

To decrease the drag and/or lift created by the bending and twisting of the first wing 104 (e.g., the deflection of the outboard wing section 202), the first and second actuators 134, 136 are employed to adjust the tension in and/or effective length of the respective first and second struts 114, 122 to change the position and/or angle of the first wing 104 and thereby affect the geometry or shape of the first wing 104. In the illustrated example, the first end 116 of the first strut 114 is coupled to the first actuator 134 and the first end 124 of the second strut 122 is coupled to the second actuator 136. The first and second actuators 134, 136 operate independently to move the respective first and second struts 114, 122. In some examples, the amount of deflection or deformation of the first wing 104 may be measured by the sensor 206. Additionally or alternatively, the amount of tension and/or length to be changed in the first strut 114 and/or the second strut 122 may depend on other factors or parameters such as, for example, the speed of the aircraft, the temperature of the surrounding air, the pressure of the surrounding air, weather conditions and/or the volume of fuel in the first wing 104. In some examples, a processor may compare one or more of these aspects with a threshold or range provided by, for example, a look-up table. In some examples, the processor determines the amount of bending and twisting of in the first wing 104 based on one or more of the parameters, an optimal wing position based on one or more of the parameters, and/or the amount of tension and/or length to be changed in the first strut 114 and/or the second strut 122 to place the first wing 104 in the optimal wing position.

FIG. 8 illustrates an example of the first wing 104 during the second flight condition (e.g., the same flight condition as in FIG. 6) after the first and second struts 114, 122 of the active strut apparatus 100 have been adjusted (e.g., moved to a second position) to change the amount of bending and twisting of the first wing 104. In the illustrated example, the first actuator 134 has changed the tension or compression in the first strut 114 and/or increased the effective length of the first strut 114 (e.g., by moving the first end 116 of the first strut 114 away from the fuselage 108). Additionally, the second actuator 136 has changed the tension or compression in the second strut 122 and/or increased the effective length of the second strut 122 (e.g., by moving the first end 124 of the second strut 122 toward the fuselage 108). As a result, the forward edge 130 (e.g., at or near the connection of the first strut 114) of the first wing 104 is moved upward and the rear edge 132 of the first wing 104 (e.g., at or near the connection of the second strut 122) is moved downward.

FIG. 9 is a cross-sectional view of the first wing 104 taken along line 9-9 of FIG. 8. In the illustrated example, the effective length of the first strut 114 has been increased compared to the first position illustrated in FIGS. 6 and 7, and the effective length of the second strut 122 has been decreased compared to the first position illustrated in FIGS. 6 and 7.

In the illustrated example of FIGS. 8 and 9, the first wing 104 (at or near the connection of the first and second struts 114, 122) is angled and/or positioned downward at angle β. As a result, the outboard wing section 202 is deflected and twisted less than the first wing 104 in the first position illustrated in FIGS. 6 and 7 and, thus, the drag and/or lift caused by the bending and twisting is reduced. In this manner, the example active strut apparatus 100 can change (e.g., decrease) the amount of wing deflection (e.g., bending, twisting, etc.). The angle β may be any amount (e.g., 3°, 5°, 10°, etc.) depending on the operation of the first and second actuators 134, 136.

In some examples, an increase in drag may be desirable such as, for example, when descending or landing. In such an instance, the geometry or shape of the first wing 104 may be changed to increase the drag and/or decrease the amount of lift and better control the aircraft 102. Additionally, the shape of the first wing 104 may be changed differently than the shape of the second wing 106, which also results in improved control of the aircraft 102. For example, the shape of the first wing 104 may be changed to produce more or less roll. As a result, there may be less reliance on the ailerons to control the roll of the aircraft 102. Further, because of the length of the first wing 104, a larger roll moment can be created than typically seen with smaller, conventional ailerons. Additionally, the active strut apparatus 100 enables the aircraft 102 to employ longer wings (e.g., higher aspect ratio wings) that produce more efficient flight.

FIG. 10 illustrates an example jackscrew actuator 1000 that may be employed to implement, for example, the first actuator 134 and/or second actuator 136 of the example active strut apparatus 100 disclosed above. The jackscrew 1000 includes a motor 1002, a gear apparatus 1004 (e.g., a gear train), a screw 1006, a ball screw 1008 and stem 1010 (e.g., a pin, a shaft, etc.). The motor 1002 operates to rotate the gears of the gear apparatus 1004 to rotate the screw 1006. As the screw 1006 rotates, the ball screw 1008, which is threadably coupled to the screw 1006, moves either inward or outward, depending on the direction of rotation. The ball screw 1008 either forces the stem 1010 outwards or pulls the stem 1010 inward. For example, if implemented as the first actuator 134 of the active strut apparatus 100 disclosed above, the jackscrew 1000 is coupled to the fuselage 108 and the first end 116 of the first strut 114 is coupled to the stem 1010. The jackscrew 1000 operates to move the first strut 114 inward or outward and, thus, toward or away from the fuselage 108 (FIG. 1). In some examples, the first end 116 of the first strut 114 is fixedly coupled to the stem 1010 of the actuator 1000. In other examples, the first end 116 of the first strut 114 may be pivotably coupled to the stem 1010 of the actuator 1000.

FIG. 11 illustrates another example jackscrew actuator 1100 (e.g., a cable operated jackscrew) that may be used to implement, for example, the first actuator 134 and/or the second actuator 136 of the example active strut apparatus 100 disclosed above. The jackscrew 1100 has a first connector 1102 that may be coupled to, for example, the fuselage 108 (FIG. 1), a motor or actuating component 1104 (e.g., an in-line motor), and a stem 1106 (e.g., a pin, a shaft, etc.) with a second connector 1108 that may be coupled to, for example, the first end 116 of the first strut 114. The motor 1104, which is in-line with the first connector 1102 and the stem 1106, moves the stem 1106 inward or outward and, thus, moves the first end 116 of the first strut 114 toward or away from the fuselage 108 (FIG. 1). In the illustrated example, the jackscrew 1100 does not have a gear system, which reduces the amount of space utilized by the jackscrew 1100.

In the illustrated example, the second connector 1108 is coupled to the first strut 114. However, in other examples, the first connector 1102 may be coupled to the first strut 114 and the second connector 1108 may be coupled to the fuselage 108 (FIG. 1). In the illustrated example, the first end 116 of the first strut 114 has a connector designed to pivotably couple with the second connector 1108. In other examples, the first end 116 of the first strut 114 is fixedly coupled to the second connector 1108 of the jackscrew 1100.

FIG. 12 is an example shape memory alloy actuator 1200 that may be used to implement, for example, the first actuator 134 and/or the second actuator 136 of the example active strut apparatus 100 disclosed above. The actuator 1200 includes a first interface fitting 1202 on one end, a second fitting 1204 on the opposite end, a plurality (e.g., a bundle) of shape memory wires 1206, a load block 1208, and insulating load fitting 1210. In the illustrated example, one of the first or second fittings 1202, 1204 may be coupled to the fuselage 108 and the other of the first or second fittings 1202, 1204 may be coupled to an end of one of the first or second struts 114, 122. For example, the first fitting 1202 may be coupled to the fuselage 108 (FIG. 1) and the first end 116 of the first strut 114 may be coupled to the second fitting 1204. To operate the actuator 1202, heat and/or electricity is applied to the shape memory allow wires 1206, which causes the wires 1206 to expand or contract. In the illustrated example, the first end 116 of the first strut 114 has a connector designed to pivotably couple with the second fitting 1204. In other examples, the first end 116 of the first strut 114 is fixedly coupled to the second fitting 1204 of the actuator 1200.

Figure 13:
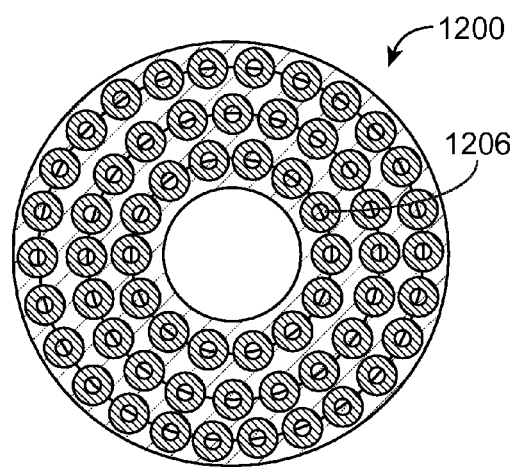
FIG. 13 is a cross-sectional view of the example actuator or the example strut of FIG. 12 taken along line 13-13.

FIG. 13 is a cross-sectional view of the example actuator 1200 taken along line 13-13 in FIG. 12. In the illustrated example of FIGS. 12 and 13, a plurality of shape memory alloy wires 1206 are bundled together. However, in other examples, only one shape memory allow wire may be used. In some examples, the shape memory alloy actuator 1200 may be integrated (e.g., embedded) within the first strut 114.

Although three example actuators are illustrated in FIGS. 10, 11 and 12, other types of actuator(s) may be implemented as the first actuator 134 and/or the second actuator 136 of the example active strut apparatus 100 disclosed herein. Additionally, the first ends 116, 124 of the first and second struts 114, 122 may include any type of connector(s) for coupling to the respective first and second actuators 134, 136

Figure 14:
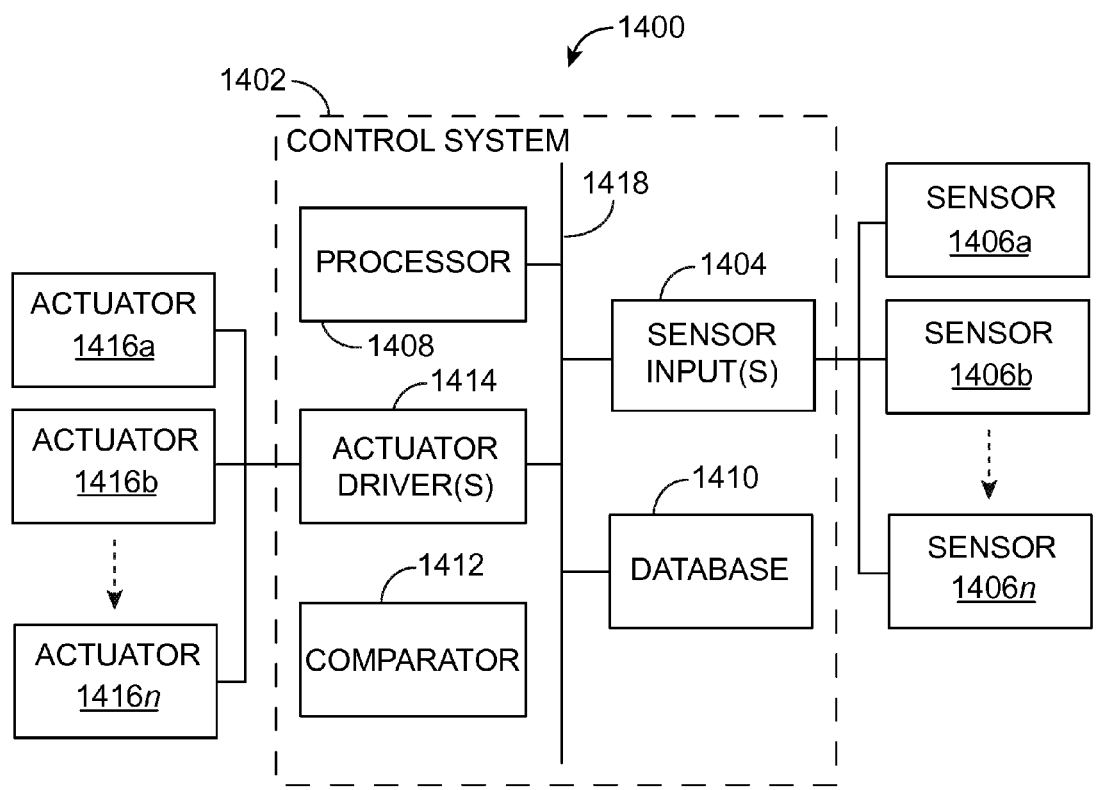
FIG. 14 is a block diagram of an example processing system for the example active strut apparatus of FIG. 1.

FIG. 14 is a block diagram of an example processing system 1400 for use with an active strut apparatus such as, for example, the active strut apparatus 100 of FIGS. 1-9. The example processing system 1400 includes a controller or control system 1402 for receiving information (e.g., from a sensor) and/or controlling one or more actuators such as, for example, the first actuator 134 and/or the second actuator 136 of the active strut apparatus 100.

In the illustrated example, the processing system 1400 includes a sensor input 1404 that receives input data (e.g., signals) from one or more sensors. In some examples, the processing system 1400 includes one or more sensor inputs 1404. In the illustrated example, the sensor input(s) 1404 are communicatively coupled to sensors 1406a-n. One of the sensors 1406a-n may correspond to, for example, the sensor 206 of the example active strut apparatus 100. For example, the sensor 206 measures an amount of strain or deformation occurring on the skin or surface of the first wing 104. In some examples, the strain gauge 206 converts the amount of strain or deformation (e.g., via a change in resistance) to an electrical signal. The signal generated by the strain gauge 206 may be sent to, for example, the sensor input(s) 1404. The sensor(s) 1406a-n may be communicatively coupled to the sensor input(s) 1406 of the processing system 1400 by any wired or wireless communication devices. In some examples, multiple sensors such as, for example, strain gauges, are coupled to the first wing 104 of the aircraft 102 and the sensors measure the amount of bending and twisting occurring at different locations of the wing. Additionally or alternatively, a plurality of other sensors such as, for example, temperature sensors, pressure sensors, airspeed indicators, altimeters, fuel gauges, etc. may provide information to the sensor input(s) 1404. In the illustrated example, the sensor input(s) 1404 are communicatively coupled to a processor 1408, which receives the data provided by the sensors 1406a-n.

In the illustrated example, the processing system 1400 includes a database 1410 (e.g., a look-up table) having a plurality of conditions and/or parameters relating to wing geometry (e.g., position, angle, shape, profile, deformation, bending, twisting, deflecting, etc.). A comparator 1412 compares the data received from the sensors 1406a-n to the parameters stored in the database to determine the amount of bending and twisting of in the first wing, an optimal wing position, and/or the amount of tension and/or effective length to be changed in one or more struts to place the wing in the optimal wing position. In the illustrated example, the sensor database 1410 and the comparator 1412 are communicatively coupled to the processor 1408.

In the illustrated example, the processing system 1400 includes a controller or actuator driver 1414, which may control, for example, the first actuator 134 and/or the second actuator 136 of the active strut apparatus 100. In some examples, the processing system 1400 includes more than one actuator drivers 1414. In the illustrated example, the actuator driver(s) 1414 are communicatively coupled to actuators 1416a-n. The actuators 1416a-n may correspond to, for example, the first actuator 134, the second actuator 136 and/or any additional actuator that may be implemented. For example, multiple active struts having respective actuators may be employed. In the illustrated example, the actuator driver(s) 1414 control operational characteristics of the actuators 1416a-n such as, for example, the speed of the actuator, the direction of actuation, the acceleration of the actuator, etc. In some examples, the processor 1408 uses the comparator 1412 and the database 1410 to determine an amount that actuators 1416a-n are to move to adjust the corresponding struts attached thereto to change the angle and/or position of the wing (e.g., at the connection of the strut(s)) to affect the geometry or shape of the wing. For example, the processor 1408 may determine the amount of deformation of the wing using the sensor input(s) 1404. In some examples, the comparator 1412 compares the input data to the parameters in the database 1410. If the amount of deformation reaches a threshold (e.g., a limit), the processor 1408 can determine (e.g., via the comparator 1412 and database 1410) an optimum angle of the wing to counteract (e.g., eliminate or reduce, overcome) the deformation of the wing. The processor 1408 may control the actuator driver(s) 1414 and send corresponding signals to the actuators 1416a-n to move the struts attached thereto.

In the illustrated example, the processing system components 1404, 1408, 1410, 1412, 1414 are communicatively coupled to other components of the example processing system 1400 via communication links 1418. The communication links 1418 may be any type of wired connection (e.g., a databus, a USB connection, etc.) and/or any type of wireless communication (e.g., radio frequency, infrared, etc.) using any past, present or future communication protocol (e.g., Bluetooth, USB 2.0, USB 3.0, etc.). Also, the components of the example system 1400 may be integrated in one device or distributed over two or more devices. In some examples, a processing system 1400 may be implemented to control the struts on both wings of the aircraft. In other examples, separate processing systems may separately control the struts on the respective wings.

While an example manner of implementing the example active strut apparatus 100 of FIGS. 1-9 is illustrated in FIG. 14, one or more of the elements, processes and/or devices illustrated in FIG. 14 may be combined, divided, re-arranged, omitted, eliminated and/or implemented in any other way. Further, the example control system 1402, the example sensor input(s) 1404, the example processor 1408, the example database 1410, the example comparator 1412, the example actuator driver(s) 1414 and/or, more generally, the example processing system 1400 of FIG. 14 may be implemented by hardware, software, firmware and/or any combination of hardware, software and/or firmware. Thus, for example, any of the example control system 1402, the example sensor input(s) 1404, the example processor 1408, the example database 1410, the example comparator 1412, the example actuator driver(s) 1414 and/or, more generally, the example processing system 1400 of FIG. 14 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example control system 1402, the example sensor input(s) 1404, the example processor 1408, the example database 1410, the example comparator 1412, and/or the example actuator driver(s) 1414 is/are hereby expressly defined to include a tangible computer readable storage device or storage disk such as a memory, a digital versatile disk (DVD), a compact disk (CD), a Blu-ray disk, etc. storing the software and/or firmware. Further still, the example processing system 1400 of FIG. 14 may include one or more elements, processes and/or devices in addition to, or instead of, those illustrated in FIG. 14, and/or may include more than one of any or all of the illustrated elements, processes and devices.

Figure 15:
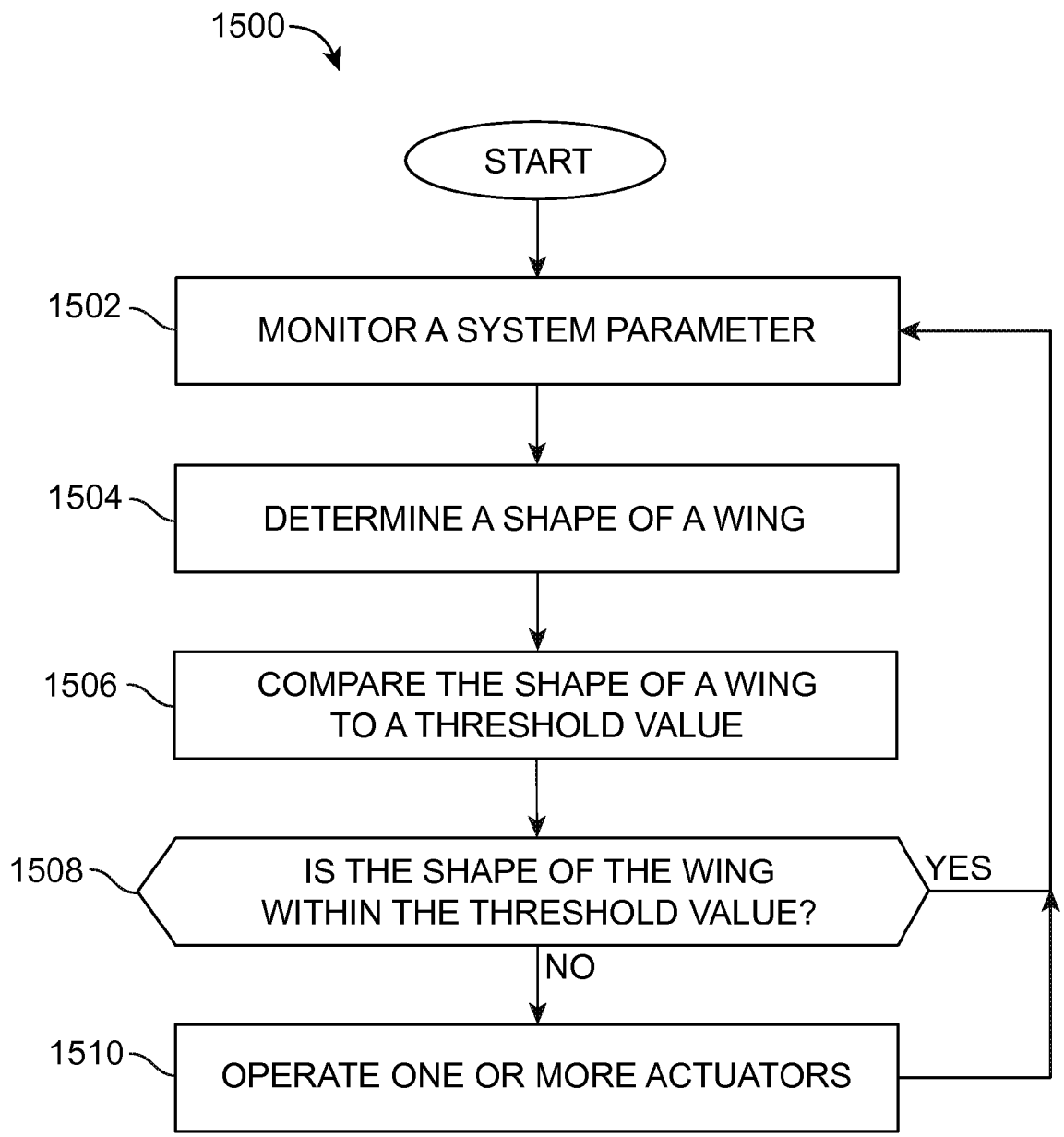
FIG. 15 is a flowchart representative of an example method that may be performed by the example active strut apparatus of FIG. 1.
Figure 16:
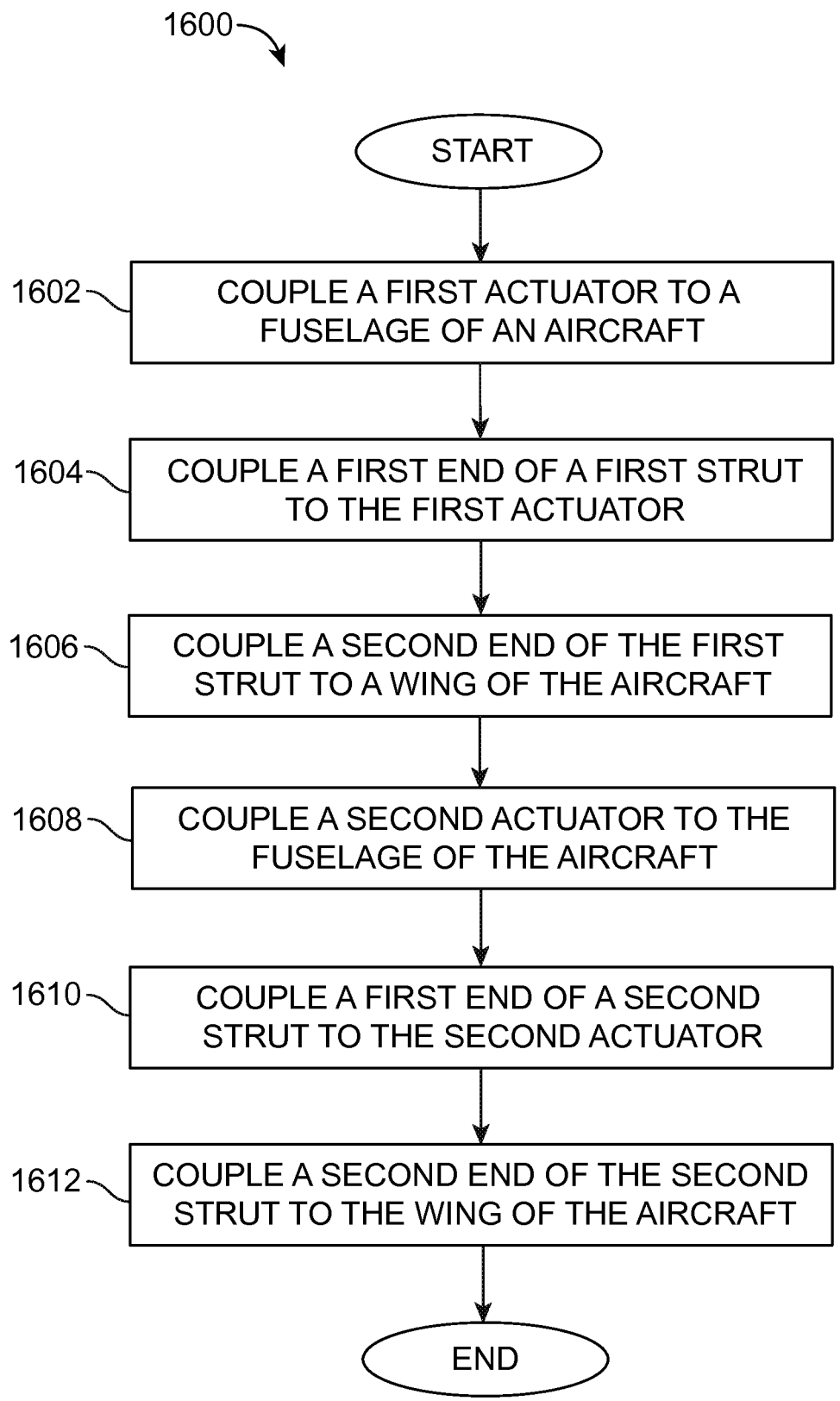
FIG. 16 is a flowchart representative of an example method of implementing the example active strut apparatus of FIG. 1.

Flowcharts representative of example methods for implementing the example active strut apparatus 100 and/or the example processing system 1400 of FIGS. 1-9 and 14 are shown in FIGS. 15 and 16. In this example, at least a portion of the methods may be implemented using machine readable instructions that comprise a program for execution by a processor such as the processor 1712 shown in the example processor platform 1700 discussed below in connection with FIG. 17. The program may be embodied in software stored on a tangible computer readable storage medium such as a CD-ROM, a floppy disk, a hard drive, a digital versatile disk (DVD), a Blu-ray disk, or a memory associated with the processor 1712, but the entire program and/or parts thereof could alternatively be executed by a device other than the processor 1712 and/or embodied in firmware or dedicated hardware. Further, although the example program is described with reference to the flowcharts illustrated in FIGS. 15 and 16, many other methods of implementing the example active strut apparatus 100 and/or the example processing system 1400 may alternatively be used. For example, the order of execution of the blocks may be changed, and/or some of the blocks described may be changed, eliminated, or combined.

As mentioned above, at least a portion of the example methods of FIGS. 15 and 16 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, at least a portion of the example methods of FIGS. 15 and 16 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 15 illustrates an example flowchart representative of an example method 1500 that may be implemented to change the geometry or shape of a wing (e.g., to affect wing deflection and/or twist) of an aircraft via operation of the active strut apparatus 100 and/or the processing system 1400. The example method 1500 includes monitoring a system parameter of an aircraft (block 1502). For example, the processing system 1400 may be configured to monitor one or more system parameters of the example active strut apparatus 100 disclosed herein. To monitor a system parameter, the processing system 1400 receives one or more signals from the sensors 1406*a-n*, which may include, for example, the sensor 206 (e.g., a strain gauge). Additionally or alternatively, other parameters may include a pressure of the surrounding air, a temperature of the surrounding air, a speed of the aircraft, an altitude of the aircraft, a flight path of the aircraft, a load of the aircraft and/or a weight of one or more of the wings of the aircraft. The processing system 1400 receives the signals via the sensor input(s) 1404.

The example method 1500 includes determining a shape of a wing (block 1504). In some examples, the sensor(s) on the wings may output signals that are indicative of the shape of the wing such as, for example, the amount of deflection, bending, twisting, etc. For example, the strain gauge sensor 206 may operate by measuring a change in resistance in the sensor, which correlates to the amount of strain and/or deformation of the first wing 104. Additionally or alternatively, other system parameters can be used to determine the shape of the wing such as, for example, the speed of the aircraft, the temperature, the pressure, the volume of fuel in the wing, etc. In some examples, a look-up table with previously determined wing shapes that correspond to the various parameters may be used. For example, the database 1410 of the processing system 1400 may include a plurality of parameters and corresponding (e.g., resulting) wing deflection tables (e.g., wing deflection shapes that have previously been determined as resulting from certain value(s) of one or more of the parameters).

The example method 1500 includes comparing the shape of the wing to a threshold value (block 1506). In some examples, only a certain amount of wing deflection and/or twisting is allowable. If the wing deflects and/or twists too much, the wing may generate undesired drag and/or lift. Therefore, the determined shape of the wing is compared to a threshold value. For example, the processing system 1400 can compare, via the comparator 1412, the amount of deflection or twist of the wing to respective threshold values retrieved from the database 1410 (e.g., a look-up table) or with the other values received by the sensor(s) 1406*a-n*.

The example method 1500 includes determining if the shape (e.g., the deflection and/or twist) of the wing is within a threshold value (block 1508). If the shape of the wing is within the threshold value, then the method 1500 continues to monitor the system parameter (block 1502). For example, if the amount of deflection and twist in the first wing 104 is substantially equal to or around an optimum deflection and/or twist for cruise conditions, the processing system 1400 may cause the first actuator 134 and the second actuator 136 to remain in the same position (e.g., and retain the same tensions and/or effective length).

If the shape of the wing is not within the threshold value, the example method 1500 includes operating one or more actuators (block 1510). For example, if the processing system 1400 determines that the shape of the wing is not within the threshold value, then the processing system 1400 commands the actuator driver(s) 1414 to operate the actuators 1416*a*-*n*, which may correspond to, for example, the first actuator 134 and/or the second actuator 136. In some examples, the shape of the wing is associated with an amount of drag and/or lift generated by the wing, which can then be compared to a threshold. For example, if the amount of bending and/or twisting in the first wing 104 is causing an amount of drag and/or lift that is outside of the threshold value (e.g., for a certain condition), the processing system 1400 may cause the first actuator 134 and/or the second actuator 136 to change the tension in and/or effective length of the respective first strut 114 and/or the second strut 122. As a result, the angle and/or position of the first wing 104 (at the connection of the first and second struts 114, 122) may be altered to change the shape of the wing and alter the amount of drag and/or lift in the first wing 104. After operating one or more actuators (block 1510) the example method 1500 may continue to monitor the system parameter (block 1502). For example, after operating one or more of the actuators to change the geometry or shape of the wing, the system parameters may be further monitored to determine if the parameters change in a way that results in a wing shape and/or amount of drag and/or lift that is outside of the threshold.

FIG. 16 illustrates an example flowchart representative of an example method 1600 to implement the active strut apparatus 100 and/or the processing system 1400. The example method 1600 includes coupling a first actuator to a fuselage of an aircraft (block 1602). For example, in the example active strut apparatus 100, the first actuator 134 may be coupled to the fuselage 108. The example method 1600 includes coupling a first end of a first strut to the first actuator (block 1604). For example, in the active strut apparatus 100, the first end 116 of the first strut 114 is coupled to the first actuator 134. By connecting the first end 116 of the first strut 114 to the first actuator 134, the first strut 114 is coupled to the fuselage 108. The example method 1600 includes coupling a second end of the first strut to a wing of the aircraft (block 1606). In some examples, the first strut may be coupled to a spar in the wing. For example, in the active strut apparatus 100, the second end 118 of the first strut 114 may be coupled to the forward spar 120 of the first wing 104. In other examples, the first strut 114 may be coupled to the skin or another surface of the wing (e.g., at or near a spar or rib in the wing).

In some examples, only one active strut may be implemented to change the shape of the wing. However, in other examples more than one active strut may be used. In such an instance, the method 1600 includes coupling a second actuator to the fuselage of the aircraft (block 1608). For example, in the example active strut apparatus 100, the second actuator 136 may be coupled to the fuselage 108. The example method 1600 includes coupling a first end of a second strut to the second actuator (block 1610). For example, in the active strut apparatus 100, the first end 124 of the second strut 122 is coupled to the second actuator 136. By connecting the first end 124 of the second strut 122 to the second actuator 136, the second strut 122 is coupled to the fuselage 108. The example method 1600 includes coupling a second end of the second strut to the wing of the aircraft (block 1612). In some examples, the second strut may be coupled to a spar in the wing. For example, in the active strut apparatus 100, the second end 126 of the second strut 122 is coupled to the rear spar 128 of the first wing 104. In other examples, the second strut may be coupled to the skin or another surface of the wing (e.g., at or near a spar or rib in the wing). The example method 1600 is tailor toward one wing of the aircraft. It is to be understood that the example method 1600 may also be implemented to employ one or more active struts on another wing of the aircraft.

Figure 17:
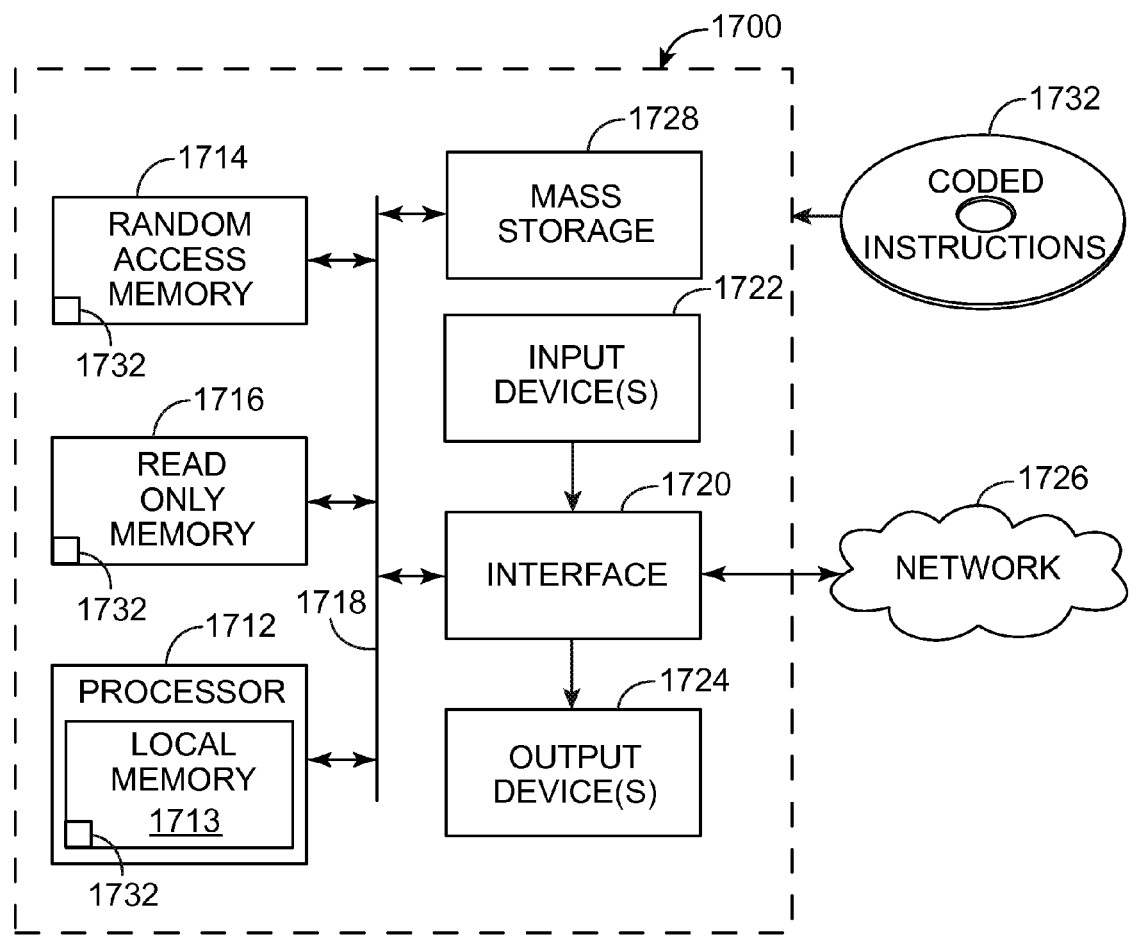
FIG. 17 is a diagram of a processor platform for use with the examples disclosed herein.

FIG. 17 is a block diagram of an example processor platform 1700 capable of executing the instructions to implement at least a portion the methods of FIGS. 15 and 16 to implement the example active strut apparatus 100 and/or the example processing system 1400 of FIGS. 1-9 and 14. The processor platform 1700 can be, for example, a server, a personal computer, a mobile device (e.g., a cell phone, a smart phone, a tablet such as an iPad™), a personal digital assistant (PDA), an Internet appliance, or any other type of computing device.

The processor platform 1700 of the illustrated example includes a processor 1712. The processor 1712 of the illustrated example is hardware. For example, the processor 1712 can be implemented by one or more integrated circuits, logic circuits, microprocessors or controllers from any desired family or manufacturer.

The processor 1712 of the illustrated example includes a local memory 1713 (e.g., a cache). The processor 1712 of the illustrated example is in communication with a main memory including a volatile memory 1714 and a non-volatile memory 1716 via a bus 1718. The volatile memory 1714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1716 may be implemented by flash memory and/or any other desired type of memory device. Access to the main memory 1714, 1716 is controlled by a memory controller.

The processor platform 1700 of the illustrated example also includes an interface circuit 1720. The interface circuit 1720 may be implemented by any type of interface standard, such as an Ethernet interface, a universal serial bus (USB), and/or a PCI express interface.

In the illustrated example, one or more input devices 1722 are connected to the interface circuit 1720. The input device(s) 1722 permit(s) a user to enter data and commands into the processor 1712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1724 are also connected to the interface circuit 1720 of the illustrated example. The output devices 1724 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 1720 of the illustrated example, thus, typically includes a graphics driver card, a graphics driver chip or a graphics driver processor.

The interface circuit 1720 of the illustrated example also includes a communication device such as a transmitter, a receiver, a transceiver, a modem and/or network interface card to facilitate exchange of data with external machines (e.g., computing devices of any kind) via a network 1726 (e.g., an Ethernet connection, a digital subscriber line (DSL), a telephone line, coaxial cable, a cellular telephone system, etc.).

The processor platform 1700 of the illustrated example also includes one or more mass storage devices 1728 for storing software and/or data. Examples of such mass storage devices 1728 include floppy disk drives, hard drive disks, compact disk drives, Blu-ray disk drives, RAID systems, and digital versatile disk (DVD) drives.

Coded instructions 1732 to implement at least a portion of the methods of FIGS. 15 and 16 may be stored in the mass storage device 1728, in the volatile memory 1714, in the non-volatile memory 1716, and/or on a removable tangible computer readable storage medium such as a CD or DVD.

From the foregoing, it will be appreciated that the above disclosed apparatus and methods may be implemented to advantageously change the geometry or shape (e.g., deformation, deflection, twist, profile, curvature, etc.) of an aircraft wing to change the amount of drag and/or lift exerted on the wing by aerodynamic loads. As a result, longer, more efficient wings may be used on an aircraft while maintaining better control and maneuverability that known aircraft wings.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
    an aircraft having a fuselage and a fixed wing extending from the fuselage;
    a first strut having a first end and a second end opposite the first end, the first end coupled to the fuselage and the second end coupled to the wing;
    a second strut having a third end and a fourth end opposite the third end, the third end coupled to the fuselage and the fourth end coupled to the wing, the first strut and the second strut coupled to the wing along a chord extending from a fore edge of the wing to a rear edge of the wing;
    a first actuator coupled to the first strut to change an effective length of the first strut;
    a second actuator coupled to the second strut to change an effective length of the second strut;
    a sensor to measure a deflection of the wing outboard of the chord; and
    a controller to, based on the deflection of the wing, actuate at least one of the first actuator or the second actuator to change an angle of the wing at the chord.

2. The apparatus of claim 1, wherein the first actuator is coupled between the first end of the first strut and the fuselage of the aircraft.

3. The apparatus of claim 1, wherein the second end of the first strut is coupled to the wing proximate a forward spar in the wing and the fourth end of the second strut is coupled to the wing proximate an aft spar in the wing.

4. The apparatus of claim 1, wherein the controller is to actuate at least one of the first actuator or the second actuator based on at least one of an altitude of the aircraft, a speed of the aircraft, or a weight of the wing of the aircraft.

5. The apparatus of claim 4, wherein the sensor is coupled to the wing.

6. The apparatus of claim 1, wherein the first actuator comprises a shape memory alloy wire.

7. An apparatus comprising:
    a first strut operatively coupled between a fuselage of an aircraft and a fixed wing of the aircraft to support the wing during flight;
    a second strut operatively coupled between the fuselage and the wing to support the wing during flight, the first strut and the second strut coupled to the wing along a chord extending from a fore edge of the wing to a rear edge of the wing;
    a first actuator to adjust a tension in the first strut during flight;
    a second actuator to adjust a tension in the second strut during flight;
    a sensor coupled to the wing to detect twist in the wing; and
    a controller to, based on the twist in the wing, actuate at least one of the first actuator or the second actuator to change a position of the wing at the chord.

8. The apparatus of claim 7, wherein the first strut is coupled to a forward spar in the wing.

9. The apparatus of claim 8, wherein the second strut is coupled to an aft spar in the wing.

10. A method comprising:
    measuring, via a sensor, a deflection of an outboard section of a wing of an aircraft during flight, the aircraft including:
        a first strut coupled between the wing and a fuselage of the aircraft, the first strut coupled to the first wing at a first point;
        a second strut coupled between the wing and the fuselage of the aircraft, the second strut coupled to the wing at a second point, the outboard section of the wing between the first and second points and a tip of the wing;
        a first actuator coupled to the first strut; and
        a second actuator coupled to the second strut; and
    adjusting an effective length of at least one of the first strut or the second strut via the respective first or second actuators based on the deflection of the wing to change the deflection of the wing.

11. The method of claim 10, wherein the first strut is coupled to a forward spar in the wing and the second strut is coupled to an aft spar in the wing.

12. The method of claim 10, wherein adjusting the effective length of the first strut comprises extending the first strut to increase the effective length of the first strut and adjusting the effective length of the second strut comprises shortening the second strut to decrease the effective length of the second strut.

13. The method of claim 10, wherein the sensor is coupled to the wing.

14. The method of claim 10 further comprising:
    determining at least one of an altitude of the aircraft, a speed of the aircraft, or a volume of fuel in the wing; and
    adjusting the effective length of at least one of the first strut or the second strut based on the at least one of the altitude of the aircraft, the speed of the aircraft, or the volume of fuel in the wing.

15. The apparatus of claim 1, wherein the sensor is a strain gauge.

16. The apparatus of claim 2, wherein the second actuator is coupled between the third end of the second strut and the fuselage of the aircraft.

17. The apparatus of claim 7, wherein at least one of the first actuator or the second actuator is a jackscrew actuator.

18. The apparatus of claim 7, wherein the sensor is coupled to the wing outboard of the chord.

19. The method of claim 10 further including determining an optimal wing position by comparing the deflection to a parameter stored in a database.

20. The method of claim 10, wherein the first point and the second point are disposed along a chord extending from a fore edge of the wing to a rear edge of the wing.

* * * * *